June 10, 1930.  B. C. WOLF  1,762,907
HARROW
Filed Oct. 27, 1928
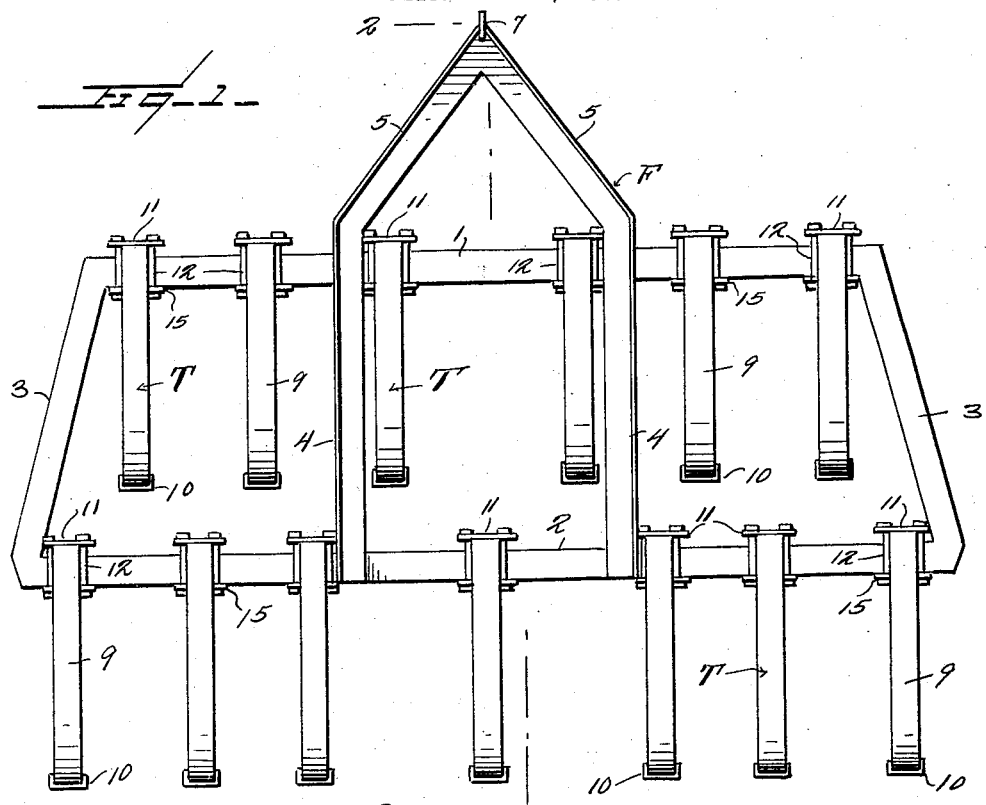
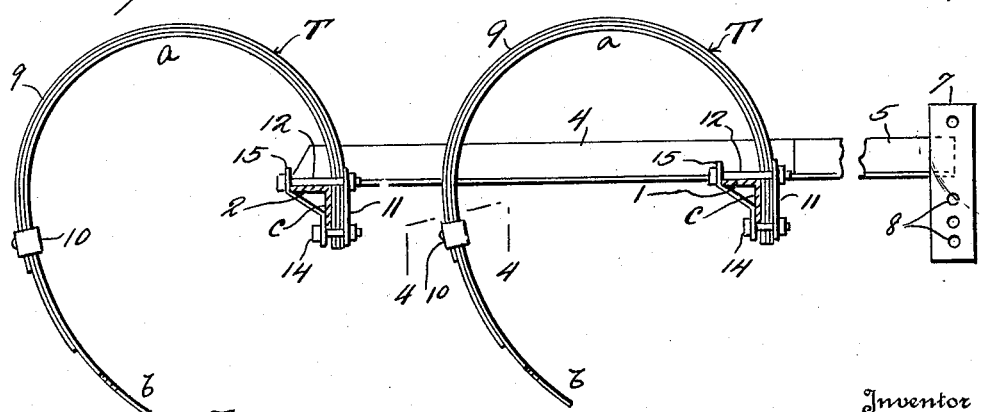
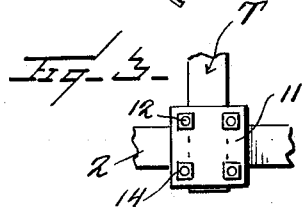
Inventor
B. C. Wolf
By Watson E. Coleman
Attorney Patented June 10, 1930

1,762,907

UNITED STATES PATENT OFFICE

BENJAMIN CHRISTIAN WOLF, OF CHEBOYGAN, MICHIGAN

HARROW

Application filed October 27, 1928. Serial No. 315,495.

This invention relates to harrows and it is an object of the invention to provide a device of this kind comprising resilient teeth, each of said teeth being formed of a plurality of superimposed leaves or laminations successively varying in length.

The invention consists in the details of construction and in the combination and arrangement of the several parts of my improved harrow whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan of a harrow constructed in accordance with an embodiment of my invention;

Figure 2 is a sectional view taken substantially on the line 2—2 of Figure 1;

Figure 3 is a fragmentary view in front elevation illustrating a clamping plate for holding the resilient tooth in applied position;

Figure 4 is a sectional view taken substantially on the line 4—4 of Figure 2.

As disclosed in the accompanying drawing, F denotes a harrow frame comprising a forward member 1 and a rear member 2 and end members 3. Each of these several members is preferably an angle iron and the rear member 2 is of a length greater than that of the front member 1 and the member 2 extends a desired distance beyond the opposite ends of the front member 1. The end members 3 are welded or otherwise suitably secured to the extremities of the members 1 and 2 and are disposed forwardly in convergence. The central portion of the frame F has rested upon the members 1 and 2 and welded or otherwise suitably secured thereto the parallel cross members 4, the forward end portions of which being continued by the converging members 5, the outer extremities of which having suitably secured thereto a vertically disposed hitch post 7. This hitch post 7 or nose-piece, as it may be called, is provided therealong with a series of openings 8, whereby the desired draft rigging may be adjustably engaged with the hitch plate or nose, as the requirements of practice may prefer.

Suitably engaged with the members 1 and 2 are a plurality of teeth T. Each of these teeth T comprises an upwardly disposed arcuate portion $a$ which is substantially semicircular in form and continued by a downwardly and forwardly curved portion $b$. The tooth T consists of a plurality of superimposed spring leaves or laminations 9 successively varying in length, with the leaf or lamination of greatest length being innermost. The laminations 9 have operatively engaged therewith and at a point preferably in relatively close proximity to the outer or free end portion of the shorter lamination 9 a clip 10.

The angle members 1 and 2 are arranged to provide forwardly disposed depending flanges $c$ and lapping each of said flanges $c$ from above is the inner end portion of a tooth T, said lapping portions being held to the flanges $c$ by the flat clamping plate 11 through the corner portions of which are disposed the upper bolts 12 and the lower bolts 14. The upper bolts 12 are disposed over and in contact with the member 1 or 2 and have engaged therewith rearwardly of the member 1 or 2 the end portion of a clamp plate 15, while the lower bolts 14 are disposed through the opposite or lower portion of the plate 15. This plate 15 has its opposite end portions offset so that the lower portion thereof will have close contact with the rear face of the depending flange $c$ of the member 1 or 2.

From the foregoing description it is thought to be obvious that a harrow constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A harrow comprising in combination, a frame and a plurality of resilient teeth carried thereby, each of said teeth having a substantially semi-cylindrical portion extending upwardly from the top of the frame and continued by a downwardly and forwardly curved portion for engagement with the soil, members disposed longitudinally across the central portion of the frame and continued by forwardly converging members, and a vertically disposed hitch plate carried by the outer extremities of the last members.

2. A harrow comprising, in combination, a frame including a member disposed in a direction substantially longitudinal to the direction of travel of the frame and extending forwardly of the frame, a resilient tooth having a substantially semi-cyclindrical inner portion continued by a downwardly and forwardly curved portion for engagement with the soil, the inner portion of the tooth lapping the member of the frame from above, and means for clamping said inner portion of the tooth to said member.

In testimony whereof I hereunto affix my signature.

BENJAMIN CHRISTIAN WOLF.